US012539703B2

(12) United States Patent
Yamagata et al.

(10) Patent No.: US 12,539,703 B2

(45) Date of Patent: Feb. 3, 2026

(54) SUPPLY SYSTEM

(71) Applicant: SEIKO EPSON CORPORATION, Tokyo (JP)

(72) Inventors: Shinya Yamagata, Matsumoto (JP); Noriyuki Fukasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 193 days.

(21) Appl. No.: 18/220,948

(22) Filed: Jul. 12, 2023

(65) Prior Publication Data

US 2024/0017552 A1 Jan. 18, 2024

(30) Foreign Application Priority Data

Jul. 13, 2022 (JP) ................................ 2022-112219

(51) Int. Cl.
*B41J 2/175* (2006.01)

(52) U.S. Cl.
CPC ................................ *B41J 2/17546* (2013.01)

(58) Field of Classification Search
CPC ...... B41J 2/17546; B41J 2/175; B41J 3/4075; G06Q 10/087; G06F 3/1288
See application file for complete search history.

(56) References Cited

U.S. PATENT DOCUMENTS 4,095,726 A * 6/1978 Hechler, IV ........ A01M 7/0046 224/148.2
6,379,058 B1 * 4/2002 Petteruti .................... B41J 3/36 400/70
6,908,179 B2 * 6/2005 Pan ...................... B41J 2/17509 347/85
2002/0126198 A1 * 9/2002 Kerr ......................... B41J 29/02 347/222
2004/0070639 A1 * 4/2004 Zerza ..................... B41J 29/393 347/19
2011/0254902 A1 * 10/2011 Kieser .................. B41J 2/17523 347/85
2020/0269593 A1 * 8/2020 Nishiyama ........... B41J 2/17566
2021/0370684 A1 * 12/2021 Devries ................ B41J 2/17523

FOREIGN PATENT DOCUMENTS

JP 2001-301198 A 10/2001

* cited by examiner

*Primary Examiner* — Jason S Uhlenhake

(74) *Attorney, Agent, or Firm* — Oliff PLC

(57) ABSTRACT

A supply system, in which each of a plurality of printers holds ink specification information for specifying a kind of ink to be supplied to the printer, includes an ink supply apparatus. The ink supply apparatus includes a plurality of ink storage units storing different kinds of ink, a plurality of ink discharging units each of which is coupled to a corresponding one of the ink storage units and discharges, to the printer, the ink stored in the coupled ink storage unit, an information reading unit that reads the ink specification information held by the printer, and a control unit that controls an ink discharging unit of the ink discharging units and causes the ink discharging unit to discharge ink, the ink discharging unit being coupled to the ink storage unit storing the kind of ink specified by the ink specification information read by the information reading unit.

6 Claims, 4 Drawing Sheets

SUPPLY SYSTEM

The present application is based on, and claims priority from JP Application Serial Number 2022-112219, filed Jul. 13, 2022, the disclosure of which is hereby incorporated by reference herein in its entirety.

BACKGROUND

1. Technical Field

The present disclosure relates to a supply system for supplying ink to printers.

2. Related Art

There have been technologies for refilling recording agent containers of printers with recording agents. In the technology of JP-A-2001-301198, a recording agent container is detached from a printer and is set on an ink refill station by a user. When the ink refill station determines that the recording agent container set on the ink refill station is not reusable, the recording agent container is collected at the ink refill station. On the other hand, when the ink refill station determines that the recording agent container set on the ink refill station is reusable, the ink refill station refills the recording agent container with a recording agent that is suitable for the recording agent container among a plurality of recording agents stored in recording agent storage units.

The recording agent container supposed in the technology of JP-A-2001-301198 is handled by a user (i) when the recording agent container is detached from the printer, (ii) when the recording agent container is attached to an ink refill station, and (iii) during a period after the recording agent container is detached from the printer before it is attached to an ink refill station. Therefore, the recording agent container may be inappropriately handled by the user or may be accidentally dropped by the user from a height. For this reason, the recording agent container supposed in the technology of JP-A-2001-301198 has a high risk of damage. Further, the life of the recording agent container supposed in the technology of JP-A-2001-301198 is set to be shorter than that of the printer body.

Damaged recording agent containers and recording agent containers whose lives have expired are determined not to be reusable and are collected at the ink refill station. The collected recording agent containers are discarded or become objects of material recycling. In the field of refilling the recording agent, a technology capable of reducing the burden on the environment is desired.

SUMMARY

According to an aspect of the present disclosure, a supply system for supplying ink to a plurality of printers is provided. The supply system, in which each of the plurality of printers holds ink specification information for specifying a kind of ink to be supplied to the printer, includes an ink supply apparatus. The ink supply apparatus includes a plurality of ink storage units storing different kinds of ink, a plurality of ink discharging units each of which is coupled to a corresponding one of the plurality of ink storage units and discharges, to the printer, the ink stored in the coupled ink storage unit, an information reading unit that reads the ink specification information held by the printer, and a control unit that controls an ink discharging unit of the plurality of ink discharging units and causes the ink discharging unit to discharge ink, the ink discharging unit being coupled to the ink storage unit storing the kind of ink specified by the ink specification information read by the information reading unit.

DESCRIPTION OF EXEMPLARY EMBODIMENTS

A. First Embodiment

A1. Configuration of Supply System

Figure 1:
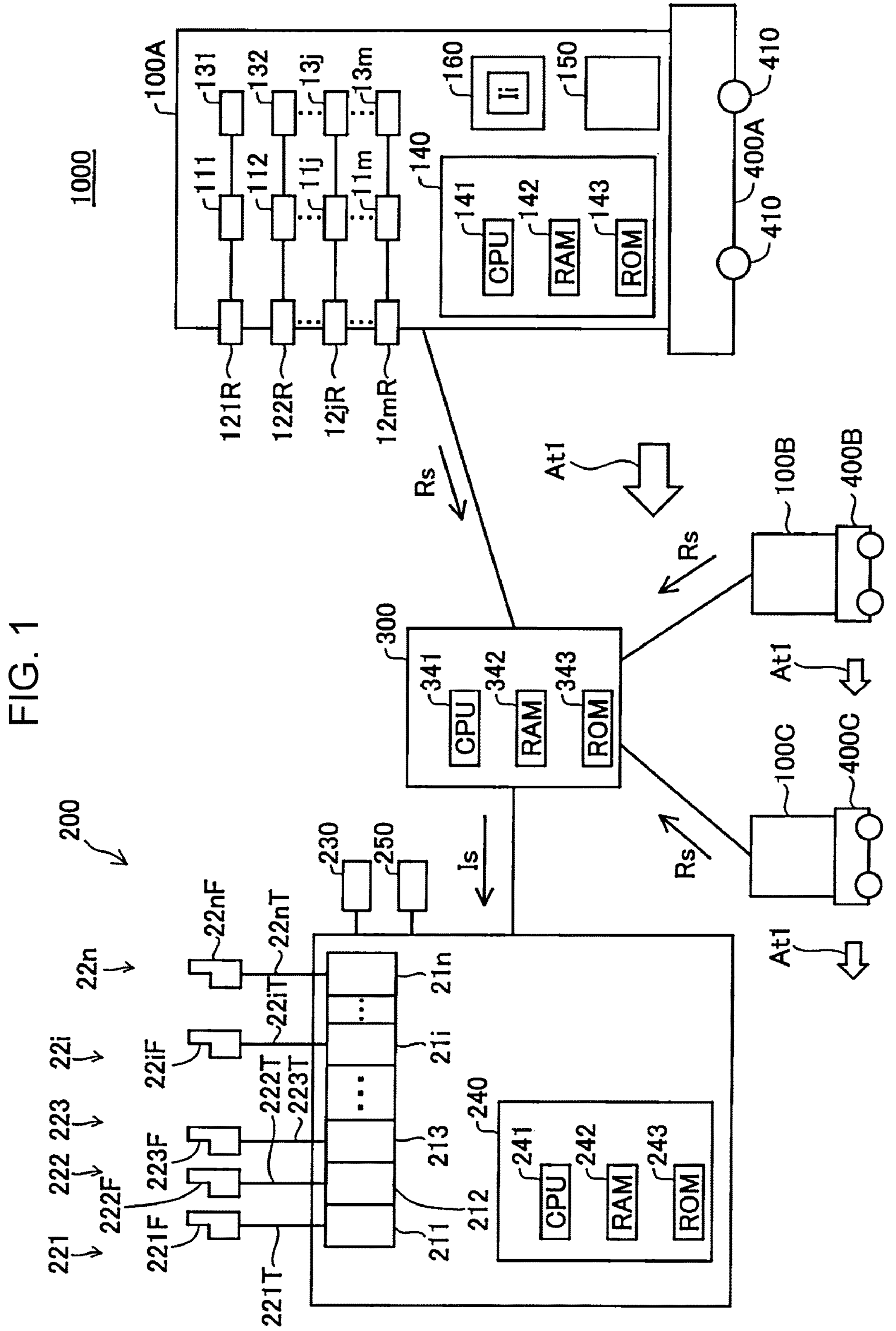
FIG. 1 is an explanatory view illustrating the overall configuration of a supply system of a first embodiment.

FIG. 1 is an explanatory view illustrating the overall configuration of a supply system 1000 of a first embodiment. The supply system 1000 supplies ink to a plurality of printers. In FIG. 1, as the plurality of printers, three printers 100A, 100B, and 100C are shown. In this specification, when the printers are referred to without distinguishing the three printers 100A, 100B, and 100C, they are referred to as the "printer 100" or the "printers 100".

The supply system 1000 includes an ink supply apparatus 200 and a management server 300. The management server 300 is connected to the ink supply apparatus 200 and the printers 100A, 100B, and 100C so as to be capable of communicating with them.

Each of the printers 100A, 100B, and 100C is a printer which receives supplied ink and performs printing (see the middle right part and bottom part of FIG. 1). The printers 100A, 100B, and 100C are installed in different departments in a company. The printers 100A to 100C are installed on bases 400A to 400C. Each of the bases 400A to 400C has wheels 410. The bases 400A to 400C can be moved by applying an external force to rotate the wheels 410.

This configuration makes it possible for each of the printers 100A to 100C installed on the bases 400A to 400C to be moved to the installation location of the ink supply apparatus 200 (see arrows At1 of FIG. 1). In the present embodiment, the printers 100 are moved from the individual departments in the company to the installation location of the ink supply apparatus 200 in the general affairs department. As a result, ink can be supplied from the ink supply apparatus 200 to each of the printers 100A to 100C installed in the different places.

Each of the printers 100A to 100C holds ink specification information Ii for identifying the kind of ink to be supplied to the corresponding printer 100A, 100B, or 100C. More specifically, the printers 100A to 100C have a two-dimensional barcode 160 representing the ink specification information Ii, on the outside of the printers 100A to 100C. The ink specification information Ii regarding each of the printers 100A to 100C includes information on the model of the printer, information for identifying the individual printer, and information indicating the ink set which the printer is using. Hereinafter, when the configurations of the printers 100A to 100C are described, the description will be made taking the printer 100A as an example.

The printer 100A includes m (m is an integer of 1 or greater) ink storage units 111 to 11*m*, m reception coupling units 121R to 12*m*R, m ink sensors 131 to 13*m*, a control unit 140, an output unit 150, and a two-dimensional barcode 160.

The ink storage units 111 to 11*m* store ink to be used when printing is performed by the printer 100A. The ink storage units 111 to 11*m* store ink of different colors.

The reception coupling units 121R to 12*m*R are coupled to the ink storage units 111 to 11*m*, respectively. Each of the reception coupling units 121R to 12*m*R is coupled to one of the plurality of ink discharging units 221 to 22*n* included in the ink supply apparatus 200, thereby receiving ink. The ink received from the ink discharging units 22*i* (i is an integer from 1 to m) by the reception coupling units 121R to 12*m*R is stored in the corresponding ink storage units 111 to 11*m*.

The ink sensors 131 to 13*m* can respectively detect that the amounts of ink stored in the ink storage units 111 to 11*m* of the printer 100A are smaller than a predetermined threshold.

The output unit 150 controlled by the control unit 140 displays a variety of information including characters, images, and sounds. Specifically, the output unit 150 is a liquid crystal panel equipped with a speaker.

The control unit 140 includes a CPU 141 which is a processor, a RAM 142, and a ROM 143 (see the middle right part of FIG. 1). The RAM 142 includes a main storage device and an auxiliary storage device. The CPU 141 realizes various functions by loading computer programs stored in the ROM 143 or the auxiliary storage device to the main storage device and executing them.

The two-dimensional barcode 160 indicates the ink specification information Ii. As described above, each ink specification information Ii indicates the kind of ink to be supplied to a corresponding one of the printers 100A to 100C.

The printers 100B and 100C are different models of printers from the printer 100A. However, the functions of the individual portions of the printers 100B and 100C are the same as the functions of the individual portions of the printer 100A. The printers 100A, 100B, and 100C are different in the ink sets which are used by those printers.

The ink supply apparatus 200 is an apparatus for supplying ink to the printers 100 (see the middle left part of FIG. 1). The ink supply apparatus 200 stores all kinds of ink which can be used in the printers 100A to 100C. The ink supply apparatus 200 is installed in a general affairs department in a company. The ink supply apparatus 200 includes n (n is an integer equal to or greater than 2 and equal to or greater than m) ink storage units 211 to 21*n*, *n* ink discharging units 221 to 22*n*, an information reading unit 230, a control unit 240, and an output unit 250.

The n ink storage units 211 to 21*n* each store different kinds of ink. The n ink discharging units 221 to 22*n* are coupled to the n ink storage units 211 to 21*n* (also referred to as the ink storage units 21*i*), respectively, and discharge ink, stored in the ink storage units 21*i* coupled thereto, to the printers 100A to 100C. The number of ink storage units 211 to 21*n* included in the ink supply apparatus 200 is the same as the number of ink discharging units 221 to 22*n* included in the ink supply apparatus 200.

Each of the n ink discharging units 221 to 22*n* includes a discharge coupling unit 22*i*F (i is an integer from 1 to n), and a coupling tube 22*i*T (i is an integer from 1 to n). The discharge coupling unit 22*i*F is coupled to one of the reception coupling units 12*j*R (j is an integer from 1 to m) of the printers 100A to 100C, and discharges ink. The coupling tube 22*i*T couples the discharge coupling unit 22*i*F to the ink storage unit 21*i*. The coupling tube 22*i*T is a flexible tube.

Figure 2:
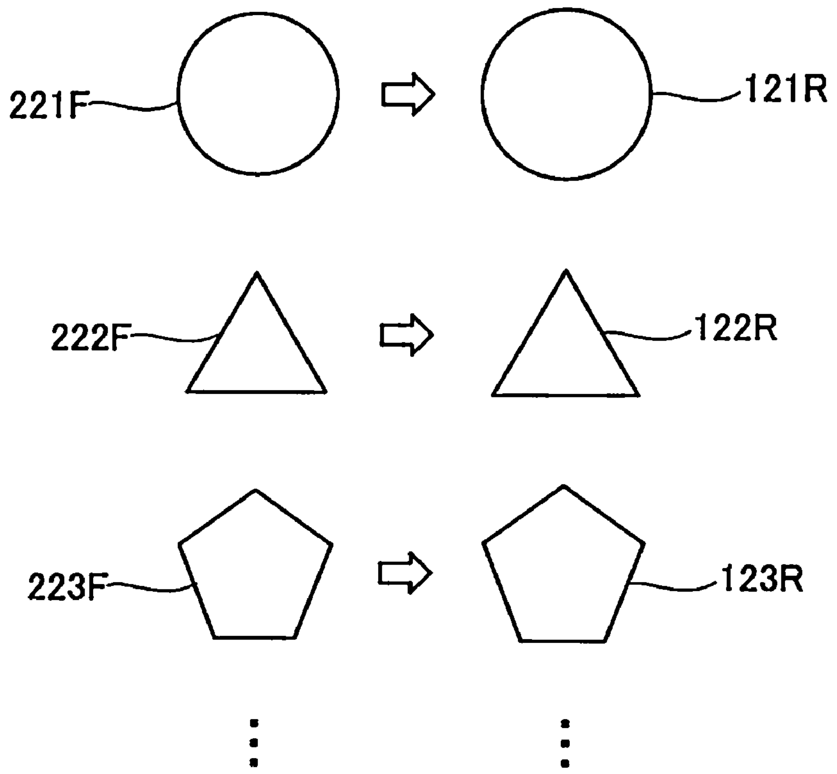
FIG. 2 is an explanatory view illustrating the shapes of end portions of discharge coupling units of an ink supply apparatus and the shapes of end portions of reception coupling units of a printer.

FIG. 2 is an explanatory view illustrating the shapes of end portions of the discharge coupling units 22*i*F (i is an integer from 1 to n) of the ink supply apparatus 200 as seen from the front, and the shapes of end portions of the reception coupling units 12*j*R (j is an integer from 1 to m) of a printer 100 as seen from the front. In the printer 100A and the ink supply apparatus 200, a reception coupling unit 12*j*R and a discharge coupling unit 22*i*F for passing different kinds of ink are configured in such shapes that they cannot be coupled to each other. A reception coupling unit 12*j*R and a discharge coupling unit 22*i*F for passing the same kind of ink are configured in shapes such that they can be coupled to each other.

The reception coupling unit 121R of the printer 100A and the discharge coupling unit 221F of the ink supply apparatus 200 pass the same kind of ink (see the upper part of FIG. 2). The shape of the end portion of the reception coupling unit 121R of the printer 100A is a circle. The shape of the end portion of the discharge coupling unit 221F of the ink supply apparatus 200 is a circle having such a size that the end portion of the discharge coupling unit 221F can be inserted into the reception coupling unit 121R of the printer 100A.

The reception coupling unit 122R of the printer 100A and the discharge coupling unit 222F of the ink supply apparatus 200 pass the same kind of ink (see the middle part of FIG. 2). The shape of the end portion of the reception coupling unit 122R of the printer 100A is an equilateral triangle. The shape of the end portion of the discharge coupling unit 222F of the ink supply apparatus 200 is an equilateral triangle having such a size that the end portion of the discharge coupling unit 222F can be inserted into the reception coupling unit 122R of the printer 100A.

The reception coupling unit 123R of the printer 100A and the discharge coupling unit 223F of the ink supply apparatus 200 pass the same kind of ink (see the lower part of FIG. 2). The shape of the end portion of the reception coupling unit 123R of the printer 100A is a regular pentagon. The shape of the end portion of the discharge coupling unit 223F of the ink supply apparatus 200 is a regular pentagon having such a size that the end portion of the discharge coupling unit 223F can be inserted into the reception coupling unit 123R of the printer 100A.

Each discharge coupling unit 22*i*F has an end portion the shape of which cannot be inserted into a reception coupling unit 12*j*R for passing a different kind of ink from the kind of ink for the discharge coupling unit 22*i*F.

This configuration enables appropriate kinds of ink to be supplied from the ink supply apparatus 200 to the printers 100 by coupling the discharge coupling units 22*i*F of the ink supply apparatus 200 to the reception coupling units 12*j*R of the printers 100. Further, it is possible to prevent inappropriate kinds of ink from being supplied from the ink supply apparatus 200 to the printers 100.

The information reading unit 230 can read the ink specification information Ii held by the individual printers 100A to 100C. Specifically, the information reading unit 230 is a barcode reader capable of optically reading the two-dimensional barcode 160 indicating the ink specification information Ii.

The output unit 250 controlled by the control unit 240 outputs a variety of information including characters, images, and sounds. Specifically, the output unit 250 is a liquid crystal panel equipped with a speaker.

The control unit 240 includes a CPU 241 which is a processor, a RAM 242, and a ROM 243. The RAM 242 includes a main storage device and an auxiliary storage device (see the middle left part of FIG. 1). The CPU 241 realizes the following functions by loading computer programs stored in the ROM 243 or the auxiliary storage device to the main storage device and executing them.

The control unit 240 controls the ink discharging unit 22*i*, of the n ink discharging units 221 to 22*n*, coupled to the ink storage unit 21*i* storing the kind of ink corresponding to ink specification information Ii read by the information reading unit 230, such that the ink discharging unit 22*i* discharges ink. The control unit 240 performs a display corresponding to the ink specification information Ii read by the information reading unit 230, on the output unit 250.

Since the printers 100 and the ink supply apparatus 200 are configured as described above, appropriate kinds of ink can be supplied from the ink supply apparatus 200 to the printers 100A to 100C by using the ink specification information Ii held by the printers 100A to 100C. Further, appropriate kinds of ink can be supplied to the printers 100A to 100C without detaching, from the printers 100A to 100C, the ink storage units 111 to 11*m* for storing ink in the printers 100A to 100C. For this reason, the printers 100A to 100C can be consistently used in their entirety without discarding the ink storage units 111 to 11*m* for storing ink in the printers 100A to 100C or using them as objects of material recycling within shorter periods as compared to the bodies of the printers 100A to 100C. Therefore, the burden on the environment is reduced.

Figure 3:
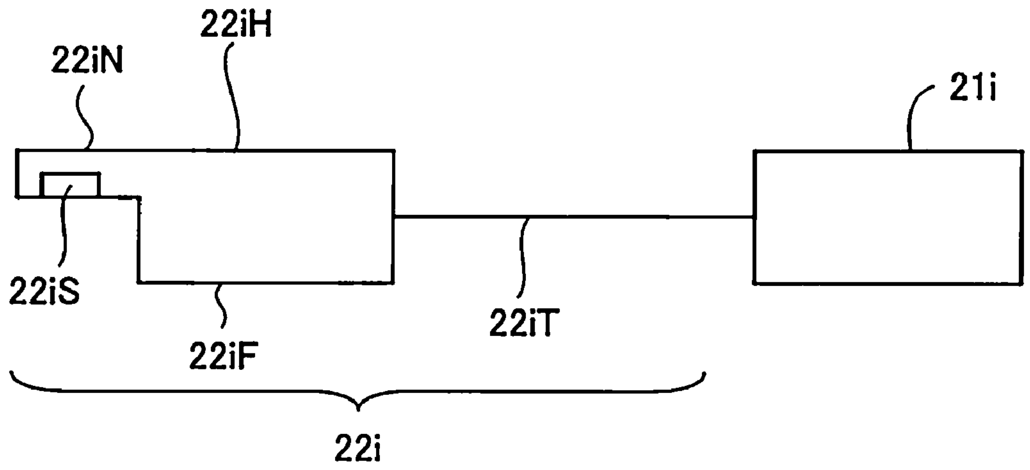
FIG. 3 is an explanatory view illustrating the configuration of a discharge coupling unit.

FIG. 3 is an explanatory view illustrating the configuration of a discharge coupling unit 22*i*F (i is an integer from 1 to n) (see also the top of the left part of FIG. 1). The discharge coupling unit 22*i*F includes a holding portion 22*i*H, a nozzle portion 22*i*N, and an ink sensing unit 22*i*S.

The holding portion 22*i*H is a portion held by the user with a hand when ink is discharged from the ink supply apparatus 200 to the printers 100A to 100C through the discharge coupling unit 22*i*F. The holding portion 22*i*H is not inserted into the printers 100A to 100C. The nozzle portion 22*i*N is inserted into a reception coupling unit 12*j*R of the printer 100A, 100B, or 100C such that ink can be discharged from the ink supply apparatus 200 to the printer 100A, 100B, or 100C through the discharge coupling unit 22*i*F, and discharges ink (see the top right part of FIG. 1).

The ink sensing unit 22*i*S is provided on the nozzle portion 22*i*N of the discharge coupling unit 22*i*F. The ink sensing unit 22*i*S is inserted into a reception coupling unit 12*j*R (j is an integer from 1 to m) of the printer 100A, 100B, or 100C when ink is discharged from the ink supply apparatus 200 to the printer 100A, 100B, or 100C through the discharge coupling unit 22*i*F (see the top right part of FIG. 1). The ink sensing unit 22*i*S can detect ink.

The ink sensing unit 22*i*S includes a switch that can turn on/off an electric circuit, and a float that is coupled to the switch and floats on ink. The individual ink discharging units 221 to 22*n* of the ink supply apparatus 200 stop discharging ink when the ink sensing units 221S to 22*n*S detect ink, respectively. More specifically, as the level of ink in the reception coupling unit 12*j*R rises, the float of the ink sensing unit 22*i*S is moved, and the electric circuit is turned off, whereby the ink discharging unit 22*i* stops discharging ink.

This configuration enables ink to be supplied to the printers 100A to 100C without making ink spill out of the reception coupling units 12*j*R of the printers 100A to 100C.

The management server 300 includes a CPU 341 which is a processor, a RAM 342, and a ROM 343 (see the middle part of FIG. 1). The RAM 342 includes a main storage device and an auxiliary storage device. The CPU 341 realizes the following functions by loading computer programs stored in the ROM 343 or the auxiliary storage device to the main storage device and executing them.

The management server 300 holds, in the auxiliary storage device, information on the kinds of ink to be used by the respective printers 100A, 100B, and 100C in association with information specifying the printers 100A, 100B, and 100C.

A2. Operation of Supply System:

Each of the printers 100A to 100C transmits an ink supply request Rs to the management server 300 when the amount of ink stored in the corresponding printer 100A, 100B, or 100C is smaller than a predetermined threshold. An ink supply request Rs is a signal indicating that it is required to supply ink to the printer 100 which is the transmitter of the ink supply request Rs. More specifically, when an ink sensor 13*j* of the ink sensors 131 to 13*m* detects that the amount of ink stored in the ink storage unit 11*j* is smaller than the predetermined threshold, the control unit 140 of the printer 100 transmits an ink supply request Rs to the management server 300 (see the top right part and middle right part of FIG. 1).

Further, the control unit 140 displays, on the output unit 150, information indicating that the amount of ink stored in the ink storage unit 11*j* is smaller than the predetermined threshold, and a message for urging the ink storage unit 11*j* to receive supply of the ink same as the ink stored in the ink storage unit 11*j* from the ink supply apparatus 200. When the user of the printer 100 sees the display on the output unit 150, the user moves the printer 100 to the place where the ink supply apparatus 200 is installed (see the arrows At1 of FIG. 1).

When the ink supply request Rs is received, the management server 300 transmits, to the ink supply apparatus 200, a supply instruction Is including information indicating the printer 100 having transmitted the ink supply request Rs (see the middle part of FIG. 1). The supply instruction Is is a signal indicating that it is required to supply ink to the printer 100 having transmitted the ink supply request Rs.

When the supply instruction Is is received, the ink supply apparatus 200 outputs, to the output unit 250, information for urging supply of ink to the printer 100 having transmitted the ink supply request Rs. More specifically, when the supply instruction Is is received, the control unit 240 of the ink supply apparatus 200 controls the output unit 250 to display information on the printer 100 having transmitted the ink supply request Rs and a message for urging supply of ink to the printer 100. This display makes it possible for the operator of the ink supply apparatus 200 to recognize the printer 100 requiring supply of ink from the ink supply apparatus 200.

When the printer 100 arrives, the operator of the ink supply apparatus 200 reads the two-dimensional barcode 160 attached to the printer 100, with the information reading unit 230. The control unit 240 of the ink supply apparatus 200 activates one or more ink discharging units 22*i* coupled to one or more ink storage units 21*i* storing ink indicated by the ink specification information Ii. The operator of the ink supply apparatus 200 supplies ink to the ink storage units 11*j* of the printer 100, using the one or more activated ink discharging units 22*i*. At that time, the nozzle portion 22*i*N of the discharge coupling unit 22*i*F is inserted into the reception coupling unit 12*j*R, having a corresponding shape, of the printer 100 (see FIG. 2).

By performing this process, the operator of the ink supply apparatus 200 supplies ink from the ink supply apparatus 200 to the printer 100 in response to the output of the output unit 250 originated from the supply instruction Is, whereby it is possible to refill the printer 100 with ink before the printer 100 is caused to be unable to print due to a shortage of ink. Further, when the printer 100 stores a sufficient amount of ink, it is possible to avoid refilling the printer 100 with ink. In other words, it is possible to reduce the number of times of refilling the printer 100 with ink.

The ink supply request Rs of the present embodiment is also referred to as a "first signal". The supply instruction Is is also referred to as a "second signal".

B. Second Embodiment

In the first embodiment, the printers 100A to 100C are moved to the installation location of the ink supply apparatus 200 to receive ink from the ink supply apparatus 200 (see the arrows At1 of FIG. 1). However, in a second embodiment, an ink supply apparatus 200*b* is moved to the installation locations of the printers 100A to 100C to supply ink to the printers 100A to 100C. Accordingly, in the second embodiment, the printers 100A to 100C are not installed on the movable bases 400A to 400C. Further, the ink supply apparatus 200*b* of the second embodiment includes a fixing tool 280 which is not included in the ink supply apparatus 200 of the first embodiment. Other points of a supply system 1000*b* of the second embodiment are the same as those of the supply system 1000 of the first embodiment.

Figure 4:
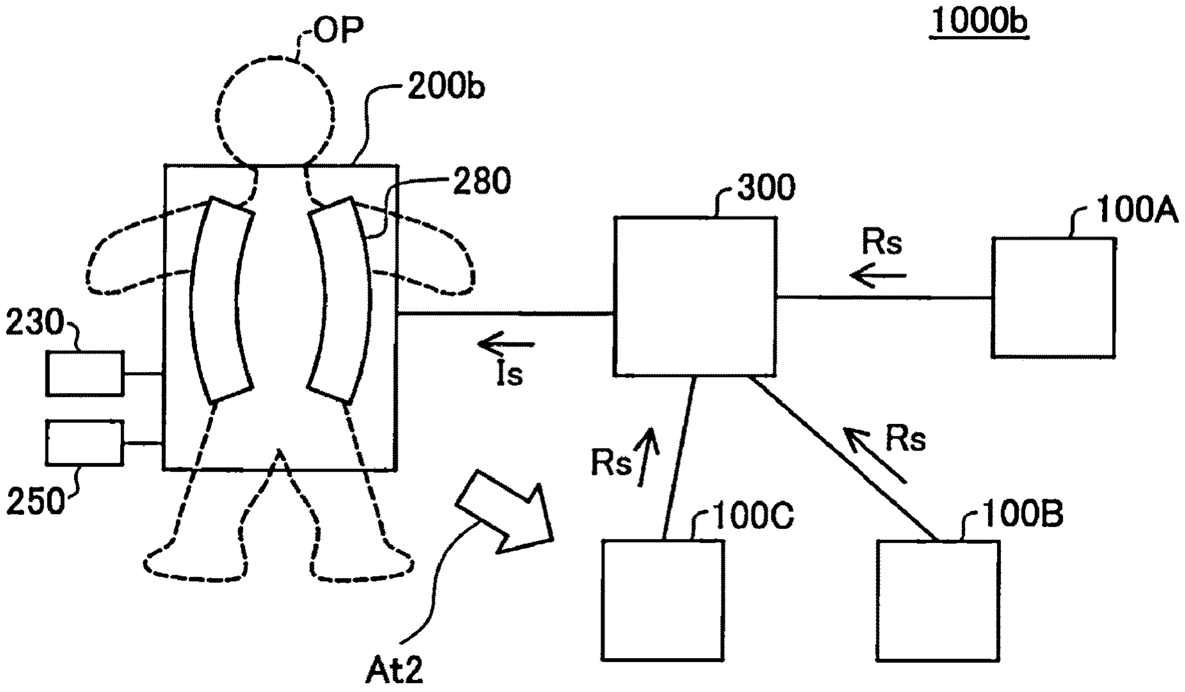
FIG. 4 is an explanatory view illustrating the overall configuration of a supply system of a second embodiment.

FIG. 4 is an explanatory view illustrating the overall configuration of the supply system 1000*b* of the second embodiment. The ink supply apparatus 200*b* includes the fixing tool 280 for fixing the ink supply apparatus 200*b* to a human body. More specifically, the fixing tool 280 is a pair of belts for holding both shoulders of an operator OP. The operator OP of the ink supply apparatus 200*b* can lift the ink supply apparatus 200*b* onto their back, using the fixing tool 280. The ink supply apparatus 200*b* is made to have such a weight that it can be lifted onto the back of the operator OP.

Similarly to the supply system 1000 of the first embodiment, when a supply instruction Is is received, the control unit 240 of the ink supply apparatus 200*b* displays, on the output unit 250, information on the printer 100 having transmitted the ink supply request Rs and a message for urging supply of ink to the printer 100. This display makes it possible for the operator of the ink supply apparatus 200*b* to recognize the printer 100 requiring supply of ink from the ink supply apparatus 200*b*. The operator of the ink supply apparatus 200*b* lifts the ink supply apparatus 200*b* onto their back, and moves to the installation location of the printer 100 requiring ink supply (see an arrow At2 of FIG. 4).

When the operator OP of the ink supply apparatus 200*b* arrives at the installation location of the printer 100, the two-dimensional barcode 160 attached to the printer 100 is read with the information reading unit 230. The control unit 240 of the ink supply apparatus 200*b* activates one or more ink discharging units 22*i* coupled to one or more ink storage units 21*i* storing ink indicated by the ink specification information Ii. The operator OP of the ink supply apparatus 200*b* supplies ink to the ink storage units 11*j* of the printer 100, using the activated ink discharging units 22*i*.

This configuration makes it possible for the operator OP with the ink supply apparatus 200*b* fixed on the operator OP to move to the installation location of the printer 100 and supply ink from the ink supply apparatus 200*b* to the printer 100.

C. Third Embodiment

In the first embodiment, in the ink supply apparatus 200, the discharge coupling units 22*i*F (i is an integer from 1 to n) for passing different kinds of ink have sectional shapes different from one another (see FIG. 2). In the printer 100, the reception coupling units 12*j*R (j is an integer from 1 to m) for passing different kinds of ink have sectional shapes different from one another. Further, a reception coupling unit 12*j*R and a discharge coupling unit 22*i*F for passing the same kind of ink have sectional shapes that are the same but are different in size. In a third embodiment, reception coupling units 12*j*R and discharge coupling units 22*i*F have shapes different from those of the first embodiment. Other points of a supply system of the third embodiment are the same as those of the supply system 1000 of the first embodiment.

Figure 5:
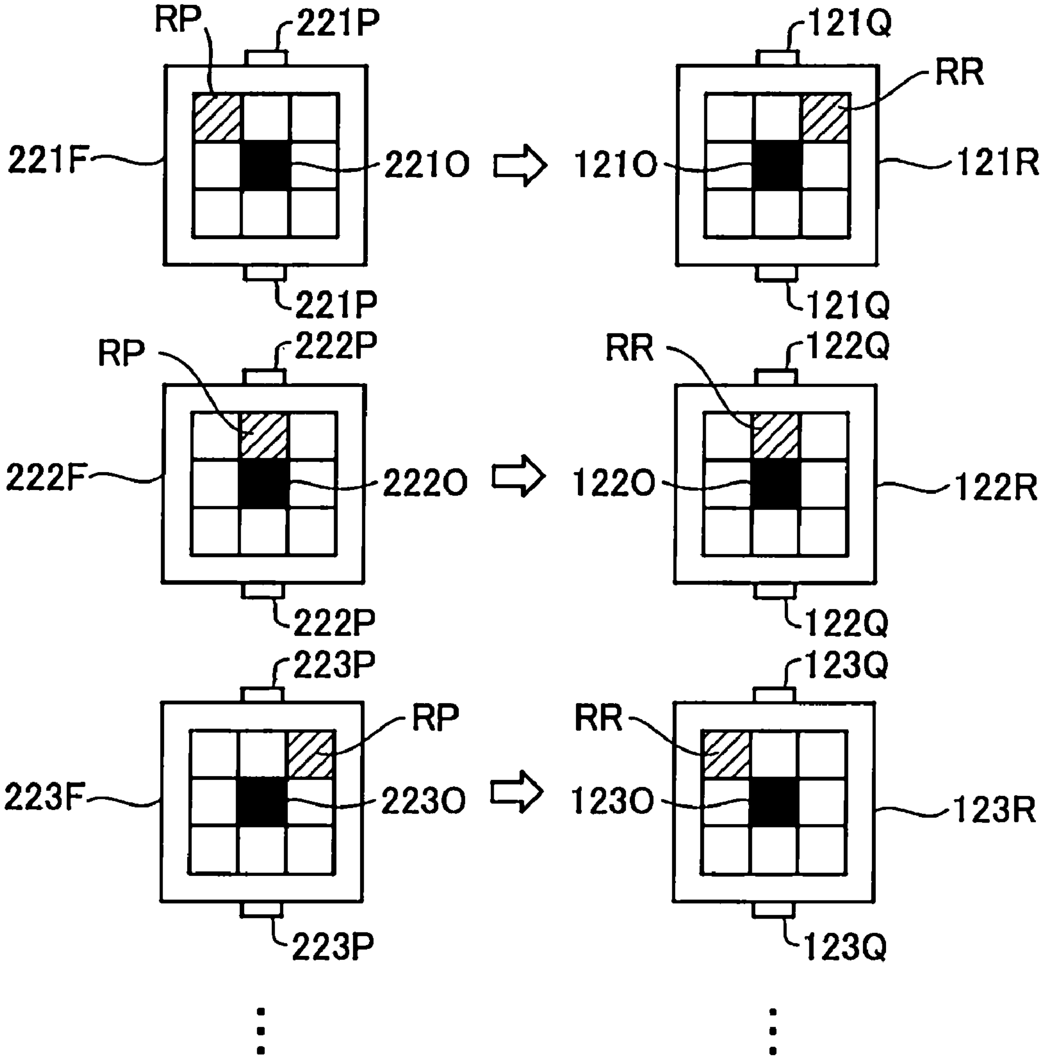
FIG. 5 is an explanatory view illustrating the shapes of the leading end portions of discharge coupling units of an ink supply apparatus and the shapes of the leading end portions of reception coupling units of a printer.

FIG. 5 is an explanatory view illustrating the shapes of the leading end portions of the discharge coupling units 22*i*F (i is an integer from 1 to n) of the ink supply apparatus 200 and the shapes of the leading end portions of the reception coupling units 12*j*R (j is an integer from 1 to m) of the printer 100. The discharge coupling units 22*i*F of the ink supply apparatus 200 and the reception coupling units 12*j*R have fixing tools 22*i*P (i is an integer from 1 to n) and fixing tools 12*j*Q (j is an integer from 1 to m) to be mutually fitted, respectively. A discharge coupling unit 22*i*F and a reception coupling unit 12*j*R corresponding to each other are fixed to each other by fixing tool 22*i*P and fixing tool 12*j*Q.

The leading end portion of each discharge coupling unit 22*i*F (i is an integer from 1 to n) of the ink supply apparatus 200 has a square flow port 22*i*0 at the center. Further, the leading end portion has eight square regions arranged so as to surround the flow port 22*i*0. The square flow port 22*i*0 and the eight square regions arranged so as to surround the flow port 22*i*0 have a square outline as a whole. Of the eight square regions, some regions RP protrude as compared to the other regions in the ink flow direction. In the discharge coupling units 22*i*F illustrated in FIG. 5, the regions RP protruding as compared to the other regions are shown by hatching.

The leading end portion of each reception coupling unit 12*j*R (j is an integer from 1 to m) of the printer 100 has a square flow port 12*j*O at the center. Further, the leading end portion has eight square regions arranged so as to surround the flow port 12*j*O. The square flow port 12*j*O and the eight square regions arranged so as to surround the flow port 12*j*O have a square outline as a whole. Of the eight square regions, some regions RR are recessed in the ink flow direction as compared to the other regions. In the reception coupling units 12*j*R illustrated in FIG. 5, the regions RR recessed as compared to the other regions are shown by hatching.

In a reception coupling unit 12*j*R and a discharge coupling unit 22*i*F for passing the same kind of ink, the recessed region RR of the reception coupling unit 12*j*R and the protruding region RP of the discharge coupling unit 22*i*F are at positions corresponding to each other. In other words, the recessed region RR of the reception coupling unit 12*j*R is configured to receive the protruding region RP of the corresponding discharge coupling unit 22*i*F.

With this configuration, also, a reception coupling unit 12*j*R and a discharge coupling unit 22*i*F for passing different kinds of ink cannot be coupled to each other. Further, a reception coupling unit 12*j*R and a discharge coupling unit 22*i*F for passing the same kind of ink can be coupled to each other.

This configuration also makes it possible to supply appropriate kinds of ink from the ink supply apparatus 200 to the printers 100 by connecting the discharge coupling units 22*i*F of the ink supply apparatus 200 to the reception coupling units 12*j*R of the printers 100. Further, it is possible to prevent inappropriate kinds of ink from being supplied from the ink supply apparatus 200 to the printers 100.

D. Other Embodiments

D1. First of Other Embodiments (1) In the above-described embodiments, the ink sensing unit 22*i*S capable of detecting ink includes the float which floats on ink (see the top right part of FIG. 1). However, the ink sensing unit 22*i*S for detecting the amount of ink in the reception coupling unit 12*j*R may be one for detecting the amount of ink according to other principles. For example, the ink sensing unit may be one for detecting that the amount of ink is smaller than a threshold, in response to a change in the amount of current flowing through the ink or a change in the amount of light reflected.

(2) In the above-described embodiments, when an ink sensor 13*j* detects that the amount of ink stored in the ink storage unit 11*j* is smaller than the predetermined threshold, the control unit 140 of the printer 100 transmits an ink supply request Rs to the management server 300 (see the top right part and middle right part of FIG. 1). It is also possible to set, as the predetermined threshold, such an amount of residual ink with which the printer can print a predetermined amount. Also, it is possible to set, as the predetermined threshold, a value indicating that ink has substantially run out.

(3) In the above-described embodiments, when the amount of ink stored in each printer 100A, 100B, or 100C is smaller than the predetermined threshold, an ink supply request Rs is transmitted to the management server 300 (see the right part and bottom part of FIG. 1). However, a plurality of thresholds for the amount of ink of the printers 100 may be set such that whenever the amount of ink reaches one of the thresholds, a signal for notification is transmitted to the management server 300. Also, whenever a predetermined period of time elapses, or whenever a predetermined process such as printing one page is performed, each of the printers 100 may transmit the residual amount of ink detected by each sensor to the management server 300 such that the management server 300 can manage the residual amount of ink of each printer 100.

(4) In the above-described embodiments, each of the printers 100A to 100C has the two-dimensional barcode 160 indicating the ink specification information Ii (see the middle right part of FIG. 1). However, each printer may hold the ink specification information Ii in other forms such as a one-dimensional barcode, an RFID (Radio Frequency Identification) tag, or a magnetic medium. The information reading unit 230 provided in the ink supply apparatus 200 may be configured to be able to read information stored in such media.

(5) In the above-described embodiments, the ink specification information Ii of each printer 100 includes information on the model, information for identifying the printer, and information indicating the ink set used by the printer (see the middle right part of FIG. 1). However, the ink specification information Ii may include, for example, information for identifying the printer 100 without including information indicating the ink set used by the printer. In such an aspect, for example, the management server 300 can hold, in a storage device, correspondence information in which printers are associated with the ink sets used in the printers. When the management server 300 receives an ink supply request Rs from a printer, the management server 300 transmits, with reference to the correspondence information, a supply instruction Is including information on the ink set used in the printer having transmitted the ink supply request Rs, to the ink supply apparatus.

Also, when the models of the printers are in one-to-one correspondence with the ink sets used in the printers, the ink specification information Ii may include information for identifying the models of the printers 100 without including information indicating the ink sets used. The information for identifying the models of the printers 100 can be handled in the same way as the information of the above-mentioned aspect for identifying the individual printers 100. In other words, the ink specification information may be information capable of finally specifying the kind of ink required to be supplied to the individual printers.

(6) In the above-described embodiments, the output unit 250 is a liquid crystal panel provided in the ink supply apparatus 200 (see the center part of FIG. 1 and the left part of FIG. 4). However, it is also possible to provide the output unit in other forms, such as a tablet computer or a smart phone that is independent of the ink supply apparatus and is wirelessly connected to the ink supply apparatus.

(7) In the second embodiment, the ink supply apparatus 200*b* is configured such that the operator OP can carry the ink supply apparatus 200*b* on their back using the fixing tool 280 (see FIG. 4). In such an aspect, the ink supply apparatus 200*b* may hold its own power source. Alternatively, for example, the ink supply apparatus 200*b* may receive power externally.

(8) In the above-described first embodiment, the ink supply apparatus 200 includes the n ink storage units 211 to 21*n* and the n ink discharging units 221 to 22*n*. Further, the n ink discharging units 221 to 22*n* are respectively coupled to the n ink storage units 211 to 21*n* (also referred to as the ink storage units 21*i*) different from one another (see the top left part of FIG. 1). However, the ink supply apparatus may include one ink discharging unit which can be coupled to the plurality of ink storage units 211 to 21*n* and discharge the ink stored in any one of the plurality of ink storage units 211 to 21*n* to a printer by switching the coupling with the plurality of ink storage units 211 to 21*n*.

(9) In the above-described first embodiment, the ink supply apparatus 200 is installed in the general affairs department in the company. In the second embodiment, the ink supply apparatus 200*b* is configured such that the operator OP can carry the ink supply apparatus 200*b* on their back (see the left part of FIG. 1 and the left part of FIG. 4). However, the ink supply apparatus may be configured in other forms. For example, a plurality of sets of discharge coupling units 22*i*F and coupling tubes 22*i*T may be coupled to one ink storage unit 21*i* (i is an integer from 1 to n) included in the ink supply apparatus through piping in the building, and the respective discharge coupling units 22*i*F may be disposed in a plurality of places in the building. According to such an aspect, it is possible to reduce the distances by which the printers 100 are moved for refilling them with ink.

(10) In the above-described embodiments, the control unit 240 of the ink supply apparatus 200 can also discharge ink based on a supply instruction Is received from the management server 300 and ink specification information Ii read by the information reading unit 230 (see the center part and middle right part of FIG. 1). Therefore, (i) the ink supply apparatus 200 may be configured to collate the supply instruction Is received from the management server 300 with ink specification information Ii read by the information reading unit 230 to specify the ink to be discharged. Also, (ii) the supply system may be configured such that the ink specification information Ii held by the printers 100A to 100C does not include information for specifying the printers 100A to 100C. In the aspect (i), it is possible to reduce the risk of discharging inappropriate ink to the printers 100A to 100C. In the aspect (ii), it is possible to reduce the information amount of the ink specification information Ii.

(11) In the above-described embodiments, the operator of the ink supply apparatus 200 supplies ink to the ink storage units 11*j* of the printers 100 (see the left part of FIG. 1 and the left part of FIG. 4). However, the users of the printers 100 may supply ink to the ink storage units 11*j* of the printers 100, using the ink discharging units 22*i*, in response to the output of the output unit 250 of the ink supply apparatus 200.

(12) In the above-described embodiments, the aspect in which one ink supply apparatus 200 supplies ink to the printers 100A, 100B, and 100C installed in the different departments in the company has been described (see FIG. 1). However, a plurality of ink supply apparatuses may supply ink to a plurality of printers installed in different departments in a company. Also, a plurality of ink supply apparatuses may supply ink to a plurality of printers installed in a plurality of companies.

In such aspects, the management server 300 may hold, in a storage device, correspondence information in which printers are associated with the ink supply apparatuses required to supply ink to the printers. When the management server 300 receives an ink supply request Rs from a printer, the management server 300 transmits, with reference to the correspondence information, a supply instruction Is to an ink supply apparatus corresponding to the printer having transmitted the ink supply request Rs.

(13) In the above-described embodiments, the management server 300 is connected to the ink supply apparatus 200 and the printers 100A, 100B, and 100C that are used in the same company, so as to be capable of communicating with them (see the center part of FIG. 1). Further, the management server 300 holds, in the auxiliary storage device, the information on the kinds of ink which are used in the printers 100A, 100B, and 100C in association with the information specifying the corresponding printer 100A, 100B, or 100C.

However, the management server 300 may be connected to a plurality of ink supply apparatuses 200 which are used in different companies and a plurality of printers 100 which are used in those companies. In such an aspect, the management server 300 may hold, in the auxiliary storage device, information on the kinds of ink which are used in the printers 100 in association with information specifying the individual printers 100.

(14) The management server 300 may be connected to a computer of an ink manufacturer or a computer of an agency of an ink manufacturer so as to be capable of communicating with such computer. Further, when the amount of ink stored in an ink storage unit 21*i* of the ink supply apparatus 200 is smaller than a predetermined threshold, the ink supply apparatus 200 may transmit an ink delivery request to the management server 300. When the management server 300 receives the ink delivery request, the management server 300 transmits a delivery instruction including information indicating the ink supply apparatus 200 having transmitted the ink delivery request, to the computer of the ink manufacturer or the computer of the agency of the ink manufacturer. The delivery instruction is a signal indicating that it is required to deliver ink to the ink supply apparatus 200 having transmitted the ink delivery request.

Also, a plurality of thresholds for the amount of ink of the ink supply apparatus 200 may be set such that whenever the amount of ink reaches one of the thresholds, a signal for notifying that is transmitted to the management server 300. Also, whenever a predetermined period of time elapses, or whenever a predetermined process such as supply of ink to a printer 100 is performed, the ink supply apparatus 200 may transmit the residual amount of ink of each ink storage unit 21*i* to the management server 300 such that the management server 300 can manage the residual amount of ink of the ink supply apparatus 200.

When the computer of the ink manufacturer receives the ink delivery request, the ink manufacturer sends ink to the ink supply apparatus 200 having transmitted the ink delivery request. When the computer of the agency of the ink manufacturer receives the ink delivery request, the agency of the ink manufacturer sends ink to the ink supply apparatus 200 having transmitted the ink delivery request. Charging for ink may be performed whenever ink is sent, or the price for ink may be paid based on a subscription contract.

D2. Second of Other Embodiments

Each of the printers 100A to 100C transmits an ink supply request Rs to the management server 300 when the amount of ink stored in the corresponding printer 100A, 100B, or 100C is smaller than the predetermined threshold (see the center part of FIG. 1). When the management server 300 receives the ink supply request Rs, the management server 300 transmits, to the ink supply apparatus 200, a supply instruction Is including information indicating the printer 100 having transmitted the ink supply request Rs. However, the supply system may be the system without including such a management server. Even in such an aspect, it is possible to supply ink from the ink supply apparatus to the printers without using detachable ink cartridges.

D3. Third of Other Embodiments

In the above-described embodiments, each of the ink discharging units 221 to 22*n* of the ink supply apparatus 200 stops discharging ink when the corresponding one of the ink sensing units 221S to 22*n*S detects ink (see FIG. 3). However, the ink supply apparatus may be the apparatus without including any ink sensing unit, and each printer may transmit a signal to the ink supply apparatus to stop supply of ink from the ink supply apparatus, when the printer detects that the amount of ink stored in the ink storage unit 21*i* reaches a predetermined threshold.

D4. Fourth of Other Embodiments

In the above-described embodiments, a reception coupling unit 12*j*R and a discharge coupling unit 22*i*F for passing different kinds of ink are configured in such shapes that they cannot be coupled to each other (see FIG. 2). However, a reception coupling unit and a discharge coupling unit for passing different kinds of ink may be configured in such shapes that they can be coupled to each other. In such an aspect, a reception coupling unit and a discharge coupling unit for passing the same kind of ink may have portions having the same color and a reception coupling unit and a discharge coupling unit for passing different kinds of ink may have portions having different colors.

Even in this configuration, a discharge coupling unit 22*i*F of the ink supply apparatus 200 and a reception coupling unit 12*j*R of a printer 100 having the same color can be coupled to supply an appropriate kind of ink from the ink supply apparatus 200 to the printer 100. Further, since the user's attention is called to the colors, it is possible to prevent inappropriate kinds of ink from being supplied from the ink supply apparatus 200 to the printers 100.

D5. Fifth of Other Embodiments

In the above-described second embodiment, the ink supply apparatus 200*b* includes the fixing tool 280 (see FIG. 4). The operator of the ink supply apparatus 200*b* lifts the ink supply apparatus 200*b* onto their back and moves to the installation location of a printer 100 requiring supply of ink (see the arrow At2 of FIG. 4). However, the ink supply apparatus may be installed on a movable base such that the ink supply apparatus can be moved to the installation locations of the printers 100A to 100C. Also, all of the ink supply apparatus and the printers may be configured to be movable.

D6. Sixth of Other Embodiments

In the above-described first embodiment, the bases 400A to 400C can be moved by applying an external force to rotate the wheels 410 (see the bottom part and right part of FIG. 1). However, the printers 100 may be installed on bases having no wheels when they are used to print, and be mounted on a platform truck having wheels to be moved for receiving supply of ink.

E. Other Configurations

The present disclosure is not limited to the above-described embodiments and can be implemented in a variety of configurations without departing from the scope of the present disclosure. For example, the present disclosure can also be implemented in the following configurations. The technical features of the above-described embodiments corresponding to the technical features of the following individual configurations may be replaced or combined appropriately, in order to solve some or all of the problems described above or in order to achieve some or all of the effects described above. In addition, when a technical feature is not described as one which is essential in this specification, it is able to remove the technical feature as appropriate.

(1) According to a configuration of the present disclosure, a supply system for supplying ink to a plurality of printers is provided. In the supply system, each of the plurality of printers holds an ink specification information for specifying a kind of ink to be supplied to the printer, and the supply system includes an ink supply apparatus. The ink supply apparatus includes a plurality of ink storage units storing different kinds of ink, a plurality of ink discharging units each of which is coupled to a corresponding one of the plurality of ink storage units and discharges, to the printer, the ink stored in the coupled ink storage unit, an information reading unit that reads the ink specification information held by the printer, and a control unit that controls an ink discharging unit of the plurality of ink discharging units and causes the ink discharging unit to discharge ink, the ink discharging unit being coupled to the ink storage unit storing the kind of ink specified by the ink specification information read by the information reading unit.

In this aspect, an appropriate kind of ink can be supplied from the ink supply apparatus to the printers by using the ink specification information held by the printers. Further, an appropriate kind of ink can be supplied to the printers without detaching the components for storing ink in the printers from the printers. For this reason, all of the printers can be consistently used without discarding the components for storing ink in the printers or using them as objects of material recycling within shorter periods as compared to the bodies of the printers. Therefore, the burden on the environment is reduced.

(2) The supply system of the above-described configuration may further include a management server connected to and configured to communicate with the ink supply apparatus and the plurality of printers. Each of the plurality of printers may transmit a first signal to the management server when an amount of ink stored in the printer is smaller than a predetermined threshold, and when the management server receives the first signal, the management server may transmit, to the ink supply apparatus, a second signal including information indicating the printer that transmitted the first signal, and the ink supply apparatus may include an output unit to output information, and when the ink supply apparatus receives the second signal, the ink supply apparatus may cause the output unit to output information for urging supply of ink to the printer that transmitted the first signal.

According to this aspect, the operator of the ink supply apparatus supplies ink from the ink supply apparatus to the printer in response to the output of the output unit. Therefore, it is possible to refill the printer with ink when the amount of ink is smaller than a predetermined threshold, before the printer is caused to be unable to print by a shortage of ink. Further, it is possible to avoid refilling, with ink, a printer storing a sufficient amount of ink. In other words, it is possible to reduce the number of times of refilling a printer with ink.

(3) In the supply system of the above-described configuration, each of the ink discharging units may include an ink sensing unit that can detect ink and can be inserted into the printer when ink is discharged to the printer, and each of the ink discharging units may stop discharging ink when the ink sensing unit detects ink.

According to this aspect, it is possible to supply ink to a printer without spilling ink out of the printer.

(4) In the supply system of the above-described configuration, each of the plurality of printers may include reception coupling units each of which can be coupled to a corresponding one of the plurality of ink discharging units and receive ink, and each of the plurality of ink discharging units may include a discharge coupling unit that can be coupled to a corresponding one of the reception coupling units of the plurality of printers and discharge ink, and the reception coupling unit and the discharge coupling unit for passing different kinds of ink may be configured to have shapes unable to be coupled to each other, and the reception coupling unit and the discharge coupling unit for passing the same kind of ink may be configured to have shapes enabled to be coupled to each other.

According to this aspect, it is possible to supply appropriate kinds of ink from the ink supply apparatus to a printer by connecting the discharge coupling units of the ink supply apparatus to the reception coupling units of the printer.

(5) In the supply system of the above-described configuration, the ink supply apparatus may include a fixing tool for fixing the ink supply apparatus to a human body.

According to this aspect, it is possible for a person with the ink supply apparatus fixed on them to move to the installation location of a printer and supply ink from the ink supply apparatus to the printer.

(6) In the supply system of the above-described configuration, each of the plurality of printers may be installed on a movable base having wheels.

According to this aspect, each printer installed on a base can be moved to the installation location of the ink supply apparatus such that ink can be supplied from the ink supply apparatus to the printer.

The present disclosure can also be implemented in a variety of configurations other than the supply system. For example, the present disclosure can be implemented in configurations such as a supply system manufacturing method, a supply system operating method, a consumable supply method, computer programs for implementing those methods, and non-temporary recording media having those computer programs recorded thereon.

What is claimed is:

1. A supply system for supplying ink to a plurality of printers that use different ink sets, each of the plurality of printers having a barcode representing ink specification information of the printer that includes information on a model of the printer, information for individually identifying the printer, and information on one-to-one correspondence between each of the plurality of printers and a respective ink set used by the printer, the supply system comprising an ink supply apparatus, wherein the ink supply apparatus includes a plurality of ink storage units storing different kinds of ink, a plurality of ink discharging units each of which is coupled to a corresponding one of the plurality of ink storage units and discharges, to the printer, the ink stored in the coupled ink storage unit, an information reading unit that reads the barcode of the printer and obtains the model of a printer and the ink set that is in one-to-one correspondence with the printer from the ink specification information of the printer, and a control unit that controls an ink discharging unit of the plurality of ink discharging units and causes the ink discharging unit to discharge ink, the ink discharging unit being coupled to the ink storage unit storing the kind of ink specified by the ink specification information read by the information reading unit.

2. The supply system according to claim 1, further comprising:

a management server connected to and configured to communicate with the ink supply apparatus and the plurality of printers, wherein each of the plurality of printers transmits a first signal to the management server when an amount of ink stored in the printer is smaller than a predetermined threshold, and when the management server receives the first signal, the management server transmits, to the ink supply apparatus, a second signal including information indicating the printer that transmitted the first signal, the ink supply apparatus includes an output unit to output information, and when the ink supply apparatus receives the second signal, the ink supply apparatus causes the output unit to output information for urging supply of ink to the printer that transmitted the first signal.

3. The supply system according to claim 1, wherein each of the ink discharging units includes an ink sensing unit configured to detect ink and be inserted into the printer when ink is discharged to the printer, and each of the ink discharging units stops discharging ink when the ink sensing unit detects ink.

4. The supply system according to claim 1, wherein each of the plurality of printers includes reception coupling units each of which is to be coupled to a corresponding one of the plurality of ink discharging units and receives ink, and each of the plurality of ink discharging units includes a discharge coupling unit which is to be coupled to a corresponding one of the reception coupling units of the plurality of printers and discharges ink, the reception coupling unit and the discharge coupling unit for passing different kinds of ink are configured to have shapes unable to be coupled to each other, and the reception coupling unit and the discharge coupling unit for passing a same kind of ink are configured to have shapes enabled to be coupled to each other.

5. The supply system according to claim 1, wherein the ink supply apparatus includes a fixing tool for fixing the ink supply apparatus to a human body.

6. The supply system according to claim 1, wherein each of the plurality of printers is installed on a base that includes a wheel and that is configured to move.

* * * * *